United States Patent
Andersson et al.

(10) Patent No.: US 12,167,441 B2
(45) Date of Patent: Dec. 10, 2024

(54) MULTIPLEXING HYBRID AUTOMATIC REPEAT REQUEST FEEDBACK

(71) Applicant: Telefonaktiebolaget LM Ericsson (publ), Stockholm (SE)

(72) Inventors: Mattias Andersson, Sundbyberg (SE); Sorour Falahati, Stockholm (SE); Bikramjit Singh, Kirkkonummi (FI); Alexey Shapin, Luleå (SE); Jonas Fröberg Olsson, Ljungsbro (SE); Yufei Blankenship, Kildeer, IL (US); Kittipong Kittichokechai, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 216 days.

(21) Appl. No.: 17/600,263

(22) PCT Filed: Apr. 1, 2020

(86) PCT No.: PCT/EP2020/059310
§ 371 (c)(1),
(2) Date: Sep. 30, 2021

(87) PCT Pub. No.: WO2020/201385
PCT Pub. Date: Oct. 8, 2020

(65) Prior Publication Data
US 2022/0183024 A1    Jun. 9, 2022

Related U.S. Application Data

(60) Provisional application No. 62/828,225, filed on Apr. 2, 2019.

(51) Int. Cl.
*H04W 72/566* (2023.01)
*H04L 1/00* (2006.01)
(Continued)

(52) U.S. Cl.
CPC ......... *H04W 72/569* (2023.01); *H04L 1/0003* (2013.01); *H04L 1/1812* (2013.01); *H04W 72/1273* (2013.01)

(58) Field of Classification Search
CPC ............ H04W 72/569; H04W 72/1273; H04L 1/0003; H04L 1/1812; H04L 1/0088; H04L 1/1864; H04L 1/1671; H04L 1/1854
See application file for complete search history.

(56) References Cited

U.S. PATENT DOCUMENTS

2019/0335435 A1* 10/2019 Gou ................. H04L 5/0055
2020/0228173 A1* 7/2020 Ye .................... H04L 5/0055
(Continued)

FOREIGN PATENT DOCUMENTS

CN     113615120 A    11/2021
WO     2018129017 A2   7/2018
(Continued)

OTHER PUBLICATIONS

EPO Communication dated May 15, 2023 for Patent Application No. 20717806.2, consisting of 6-pages.
(Continued)

*Primary Examiner* — Sharmin Chowdhury
(74) *Attorney, Agent, or Firm* — Weisberg I.P. Law, P.A.

(57) ABSTRACT

A method, network node and a wireless device for multiplexing HARQ feedback are disclosed. According to one aspect, a method includes transmitting a first hybrid automatic repeat request, HARQ, feedback responsive to a first downlink, DL, transmission, the first HARQ feedback transmitted using not more than an indicated number of bits, the first DL transmission having a first priority. The method also includes transmitting a second HARQ feedback responsive to a second DL transmission, the second DL transmission
(Continued)

having a second priority higher than the first priority. The method further includes multiplexing the first HARQ feedback and the second HARQ feedback using not more than the indicated number of bits for the first HARQ feedback, to produce a multiplexed HARQ feedback.

20 Claims, 8 Drawing Sheets

(51) Int. Cl.
*H04L 1/1812* (2023.01)
*H04W 72/1273* (2023.01)

(56) References Cited

U.S. PATENT DOCUMENTS

| 2021/0345373 | A1* | 11/2021 | Li | H04L 5/0053 |
| 2022/0116156 | A1* | 4/2022 | Takeda | H04L 1/1861 |
| 2022/0385340 | A1* | 12/2022 | Yang | H04B 7/0417 |
| 2023/0370211 | A1* | 11/2023 | Wang | H04L 1/1864 |

FOREIGN PATENT DOCUMENTS

| WO | 2018204513 A1 | 11/2018 |
| WO | 2020198467 A1 | 10/2020 |

OTHER PUBLICATIONS

International Search Report and Written Opinion dated Jul. 13, 2020 for International Application No. PCT/EP2020/059310 filed Apr. 1, 2020, consisting of 17-pages.
3GPP TSG RAN WG1 Meeting #96 R1-1902499; Title: On enhancements to intra-UE multiplexing for IIoT; Agenda Item: 7.2.6.4; Source: Intel Corporation; Document for: Discussion and Decision; Date and Location: Feb. 25-Mar. 1, 2019, Athens, Greece, consisting of 7-pages.
3GPP TSG RAN WG1 Meeting #96 R1-1901917; Title: On intra-UE DL/UL prioritization for NR URLLC; Agenda Item: 7.2.6.4; Source: Nokia, Nokia Shanghai Bell; Document for: Discussion and Decision; Date and Location: Feb. 25-Mar. 1, 2019, Athens, Greece, consisting of 11-pages.
3GPP TSG RAN WG1 Meeting #96 R1-1901693; Title: UCI enhancements for URLLC; Agenda Item: 7.2.6.1.2; Source: Vivo; Document for: Discussion and Decision; Date and Location: Feb. 25-Mar. 1, 2019, Athens, Greece, consisting of 9-pages.
Chinese Office Action and English Translation dated Dec. 19, 2023 for Application No. 202080027432.5, consisting of 29 pages.
3GPP TSG RAN WG1 Meeting #94bis R1-1810596; Title: Discussion on HARQ-ACK feedback over PUCCH and PUSCH; Agenda Item: 7.2.6.2; Source: Fujitsu; Document for: Discussion/Decision; Location and Date: Chengdu, China, Oct. 8-12, 2018, consisting of 5 pages.

* cited by examiner

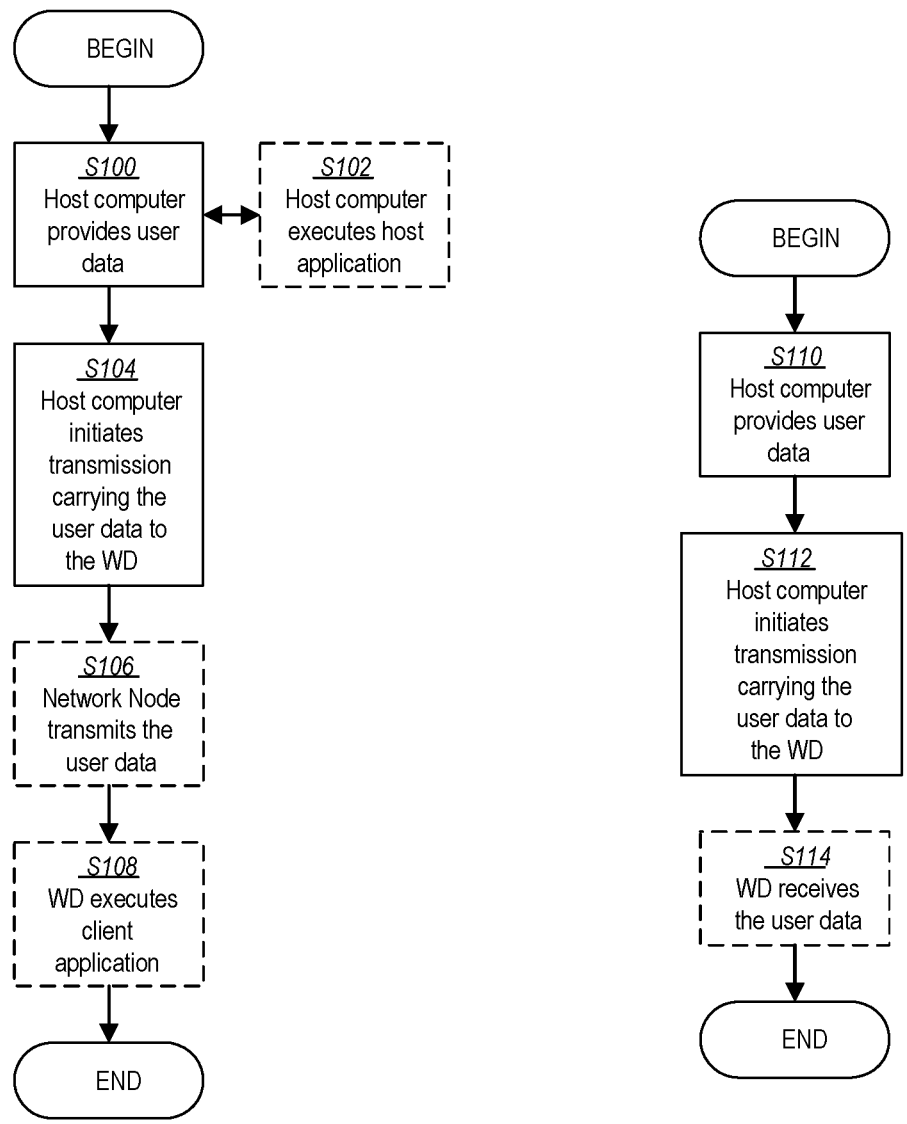

MULTIPLEXING HYBRID AUTOMATIC REPEAT REQUEST FEEDBACK

CROSS-REFERENCE TO RELATED APPLICATIONS

This application is a Submission Under 35 U.S.C. § 371 for U.S. National Stage Patent Application of International Application No.: PCT/EP2020/059310, filed Apr. 1, 2020 entitled "MULTIPLEXING HYBRID AUTOMATIC REPEAT REQUEST FEEDBACK," which claims priority to U.S. Provisional Application No. 62/828,225, filed Apr. 2, 2019, entitled "MULTIPLEXING ENHANCED MOBILE BROADBAND AND ULTRA RELIABLE LOW LATENCY COMMUNICATION HYBRID AUTOMATIC REPEAT REQUEST FEEDBACK," the entireties of both of which are incorporated herein by reference.

TECHNICAL FIELD

The present disclosure relates to wireless communications, and in particular, to multiplexing hybrid automatic repeat request (HARQ) feedback.

BACKGROUND

Ultra-reliable and low latency communication (URLLC) is one of the main use cases of Fifth Generation (5G) wireless communication technology (also known as "New Radio" (NR)). URLLC has strict requirements on transmission reliability and latency, e.g., 99.9999% reliability within 1 millisecond (ms) one-way latency. In NR $3^{rd}$ Generation Partnership Project (3GPP) Technical Release (Rel)-15, several new features and enhancements were introduced to support these requirements. In 3GPP Release-16, standardization work is focused on further enhancing URLLC system performance as well as ensuring reliable and efficient coexistent of URLLC and other NR use cases. One example scenario is when a wireless device (WD) supports both enhanced mobile broadband (eMBB) and URLLC traffic and therefore requires methods to handle multiplexing and/or prioritization of this traffic.

In 3GPP Rel-15, HARQ feedback in response to multiple downlink transmissions can be multiplexed in the same uplink (UL) transmission, either on the physical uplink control channel (PUCCH), or on the physical uplink shared channel (PUSCH). One purpose of HARQ feedback is to inform the base station that the downlink transmission was successfully received and decoded.

It has been proposed for 3GPP Rel-16 that HARQ feedback for eMBB and URLLC be transmitted using two separate codebooks, i.e., they will be encoded separately and transmitted on separate time and frequency resources.

It is not clear how to multiplex eMBB and URLLC HARQ feedback when they are scheduled by the base station (gNB) to be transmitted in physical resources that overlap in time.

SUMMARY

Some embodiments advantageously provide methods, network nodes and wireless devices for multiplexing first and second HARQ feedback, the first and second HARQ feedback having possibly different priorities. For example, some embodiments multiplex enhanced mobile broadband (eMBB) and ultra reliable low latency communication (URLLC) hybrid automatic repeat request (HARQ) feedback, where the eMBB transmission is given lower priority than URLLC. Some embodiments jointly encode the eMBB and URLLC HARQ feedback, but do not transmit all of the eMBB HARQ feedback bits. The reduction in number of eMBB HARQ feedback bits can be realized through either bundling or dropping of some of the bits. By transmitting fewer bits for eMBB HARQ feedback, fewer radio resources can be used, allowing scheduling of more wireless devices.

According to one aspect, a wireless device, configured to communicate with a network node, the wireless device comprising a radio interface and processing circuitry in communication with the radio interface. The radio interface is configured to transmit a first hybrid automatic repeat request, HARQ, feedback responsive to a first downlink (DL) transmission, the first HARQ feedback transmitted using not more than an indicated number of bits, the first DL transmission having a first priority. The radio interface is further configured to transmit a second HARQ feedback responsive to a second DL transmission, the second DL transmission having a second priority higher than the first priority. The processing circuitry is configured to multiplex the first HARQ feedback and the second HARQ feedback using not more than the indicated number of bits for the first HARQ feedback, to produce a multiplexed HARQ feedback.

According to this aspect, in some embodiments, the first DL transmission corresponds to an evolved mobile broadband, eMBB, transmission process and the second DL transmission corresponds to an ultra-reliable low latency communication, URLLC. In some embodiments, a certain number of bits of the first HARQ feedback are dropped in order to use the indicated number of bits. In some embodiments, a number of bits of the first HARQ feedback that are multiplexed is less than the indicated number of bits when there is overlap of resources for transmitting the first HARQ feedback and the second HARQ feedback. In some embodiments, there are no bits of the first HARQ feedback multiplexed with the second HARQ feedback when there is the overlap. In some embodiments, the indicated number of bits is indicated by the network node in DL control information, DCI. In some embodiments, bits are dropped from uplink control information (UCI) having the multiplexed HARQ feedback when there is overlap of resources for transmitting the multiplexed HARQ feedback, the bits being dropped according to the following priority: bits of channel state information, CSI, with low priority are dropped before bits of CSI with high priority are dropped; bits of CSI with high priority are dropped before bits of a scheduling resource, SR, are dropped; and bits of the SR are dropped before bits of the second HARQ feedback are dropped. In some embodiments, the second HARQ feedback is determined to be ultrareliable low latency communication, URLLC, feedback when the second DL transmission is scheduled with a priority indicator indicating that the second priority is higher than the first priority. In some embodiments, the multiplexed HARQ feedback includes a bit for the first HARQ feedback, the bit being set to one state when all bits of the first HARQ feedback are equal to one, and set to an opposite state, otherwise. In some embodiments, the multiplexed HARQ feedback includes a bit for the first HARQ feedback, the bit being set to one state when a plurality of detected DL packets for which the first HARQ feedback is responsive are correctly decoded, and being set to an opposite state, otherwise.

According to another aspect, a method in a wireless device configured to communicate with a network node, includes transmitting a first hybrid automatic repeat request, HARQ, feedback responsive to a first downlink (DL) transmission, the first HARQ feedback transmitted using not more than an indicated number of bits, the first DL transmission having a first priority. The method also includes transmitting a second HARQ feedback responsive to a second DL transmission, the second DL transmission having a second priority higher than the first priority. The method further includes multiplexing the first HARQ feedback and the second HARQ feedback using not more than the indicated number of bits for the first HARQ feedback, to produce a multiplexed HARQ feedback.

According to this aspect, in some embodiments, the first DL transmission corresponds to an evolved mobile broadband, eMBB, transmission process and the second DL transmission corresponds to an ultra-reliable low latency communication, URLLC. In some embodiments, a certain number of bits of the first HARQ feedback are dropped in order to use the indicated number of bits. In some embodiments, a number of bits of the first HARQ feedback that are multiplexed is less than the indicated number of bits when there is overlap of resources for transmitting the first HARQ feedback and the second HARQ feedback. In some embodiments, there are no bits of the first HARQ feedback multiplexed with the second HARQ feedback when there is the overlap. In some embodiments, the indicated number of bits is indicated by the network node in DL control information, DCI. In some embodiments, bits are dropped from uplink control information (UCI) having the multiplexed HARQ feedback when there is overlap of resources for transmitting the multiplexed HARQ feedback, the bits being dropped according to the following priority: bits of channel state information, CSI, with low priority are dropped before bits of CSI with high priority are dropped; bits of CSI with high priority are dropped before bits of a scheduling resource, SR, are dropped; and bits of the SR are dropped before bits of the second HARQ feedback are dropped. In some embodiments, the second HARQ feedback is determined to be ultrareliable low latency communication, URLLC, feedback when the second DL transmission is scheduled with a priority indicator indicating that the second priority is higher than the first priority. In some embodiments, the multiplexed HARQ feedback includes a bit for the first HARQ feedback, the bit being set to one state when all bits of the first HARQ feedback are equal to one, and set to an opposite state, otherwise. In some embodiments, the multiplexed HARQ feedback includes a bit for the first HARQ feedback, the bit being set to one state when a plurality of detected DL packets for which the first HARQ feedback is responsive are correctly decoded, and being set to an opposite state, otherwise.

According to another aspect, a network node is configured to communicate with a wireless device according to a broad band process and to communicate with the wireless device according to a low latency process. The network node includes a radio interface configured to: transmit an indication of a number of bits to be used by the wireless device to transmit a first hybrid automatic repeat request, HARQ, feedback, the first HARQ feedback being responsive to a first downlink (DL)transmission, the first DL transmission having a first priority; and receive HARQ feedback, the received HARQ feedback including at least one of the first HARQ feedback and second HARQ feedback, the second HARQ feedback being responsive to a second DL transmission, the second DL transmission having a second priority higher than the first priority. The network node also includes processing circuitry in communication with the radio interface, the processing circuitry configured to determine whether bits of the received HARQ feedback correspond to the first DL transmission or to the second DL transmission, the received HARQ feedback including the first HARQ feedback multiplexed with the second HARQ feedback, the first HARQ feedback having no more than the indicated number of bits.

According to this aspect, in some embodiments, the first DL transmission corresponds to an evolved mobile broadband, eMBB, transmission process and the second DL transmission corresponds to an ultra-reliable low latency communication, URLLC. In some embodiments, bits of the received HARQ feedback are determined to correspond to second HARQ feedback when a corresponding DL transmission is scheduled with a priority indicator configured to indicate the second priority. In some embodiments, bits of the received HARQ feedback are determined to correspond to second HARQ feedback when a corresponding DL transmission uses a modulation and coding scheme, MCS, table to determine an MCS of the corresponding DL transmission. In some embodiments, bits of the received HARQ feedback are determined to correspond to second HARQ feedback when a corresponding DL transmission uses repetition coding. In some embodiments, bits of the received HARQ feedback are determined to correspond to second HARQ feedback when corresponding retransmissions of a corresponding DL transmission are not allowed. In some embodiments, bits of the received HARQ feedback are determined to correspond to second HARQ feedback when a corresponding DL transmission occupies fewer than a predetermined number of orthogonal frequency division multiplexed (OFDM) symbols. In some embodiments, bits of the received HARQ feedback are determined to correspond to second HARQ feedback when a corresponding DL transmission occupies a predetermined bandwidth part. In some embodiments, bits of the received HARQ feedback are determined to correspond to second HARQ feedback when a corresponding DL transmission uses semi-persistent scheduling, SPS. In some embodiments, bits of the received HARQ feedback are determined to correspond to second HARQ feedback when a corresponding DL transmission uses semi-persistent scheduling, SPS, and priority is configured semi-persistently.

According to yet another aspect, a method in a network node configured to communicate with a wireless device according to a broad band process and to communicate with the wireless device according to a low latency process is provided. The method includes transmitting an indication of a number of bits to be used by the wireless device to transmit a first hybrid automatic repeat request, HARQ, feedback, the first HARQ feedback being responsive to a first downlink (DL) transmission, the first DL transmission having a first priority. The method also includes receiving HARQ feedback, the received HARQ feedback including at least one of the first HARQ feedback and second HARQ feedback, the second HARQ feedback being responsive to a second DL transmission, the second DL transmission having a second priority higher than the first priority. The method also includes determining whether bits of the received HARQ feedback correspond to the first DL transmission or to the second DL transmission, the received HARQ feedback including the first HARQ feedback multiplexed with the second HARQ feedback, the first HARQ feedback having no more than the indicated number of bits.

According to this aspect, in some embodiments, the first DL transmission corresponds to an evolved mobile broadband, eMBB, transmission process and the second DL transmission corresponds to an ultra-reliable low latency communication, URLLC. In some embodiments, bits of the received HARQ feedback are determined to correspond to second HARQ feedback when a corresponding DL transmission is scheduled with a priority indicator configured to indicate the second priority. In some embodiments, bits of the received HARQ feedback are determined to correspond to second HARQ feedback when a corresponding DL transmission uses a modulation and coding scheme, MCS, table to determine an MCS of the corresponding DL transmission. In some embodiments, bits of the received HARQ feedback are determined to correspond to second HARQ feedback when a corresponding DL transmission uses repetition coding. In some embodiments, bits of the received HARQ feedback are determined to correspond to second HARQ feedback when corresponding retransmissions of a corresponding DL transmission are not allowed. In some embodiments, bits of the received HARQ feedback are determined to correspond to second HARQ feedback when a corresponding DL transmission occupies fewer than a predetermined number of orthogonal frequency division multiplexed (OFDM) symbols. In some embodiments, bits of the received HARQ feedback are determined to correspond to second HARQ feedback when a corresponding DL transmission occupies a predetermined bandwidth part. In some embodiments, bits of the received HARQ feedback are determined to correspond to second HARQ feedback when a corresponding DL transmission uses semi-persistent scheduling, SPS.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

DETAILED DESCRIPTION

Figure 1:
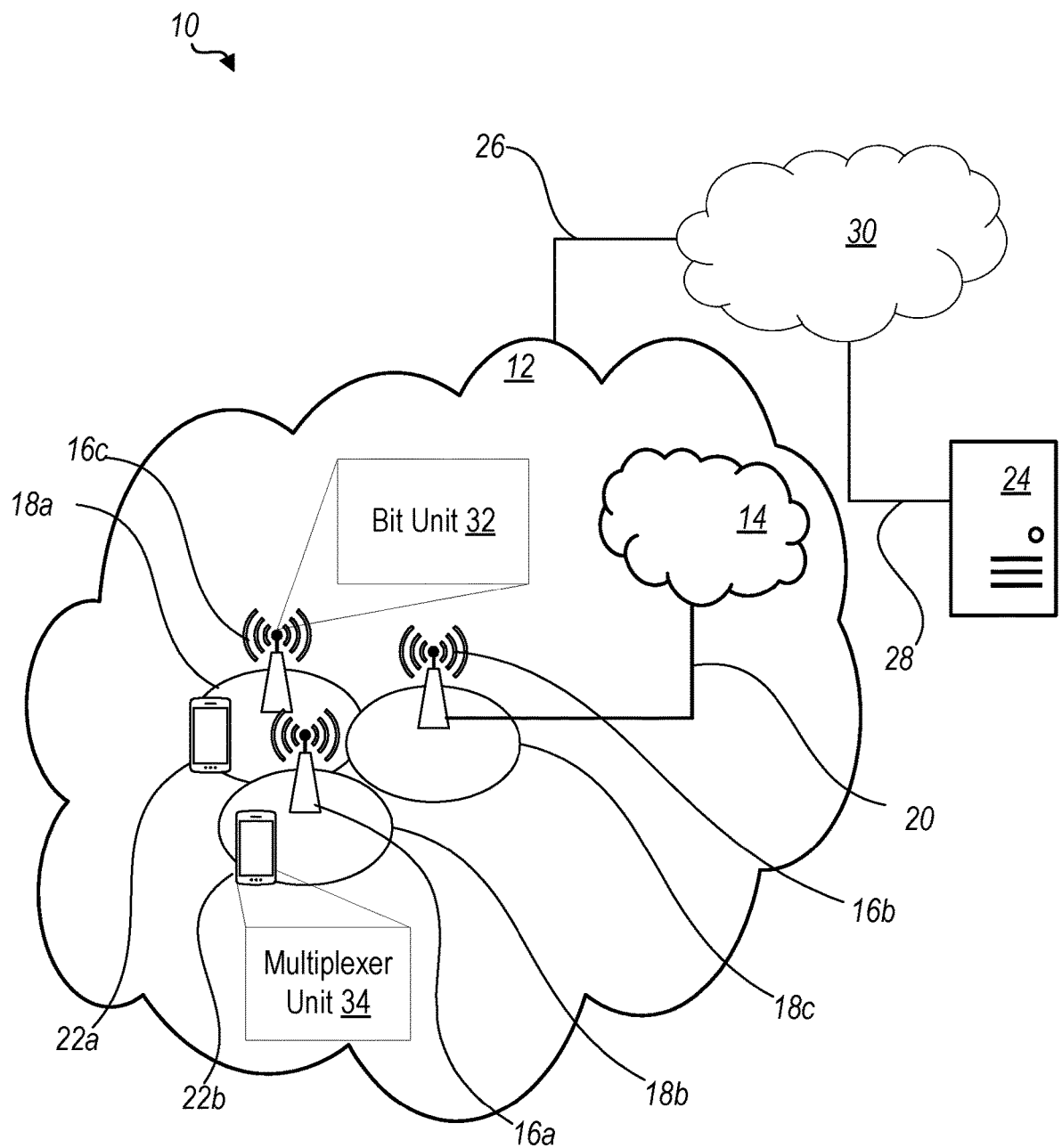
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to multiplexing first and second HARQ feedback, the first and second HARQ feedback possibly having different priorities, some embodiments including multiplexing enhanced mobile broadband (EMBB) and ultra reliable low latency communication (URLLC) hybrid automatic repeat request (HARQ) feedback. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The wireless device herein can be any type of wireless device capable of communicating with a network node or another wireless device over radio signals, such as wireless device (WD). The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In general, a wireless device can be configured with a maximum of 4 PUCCH resource sets for transmission of HARQ-acknowledgement (ACK) information. Each set is associated with a range of uplink control information (UCI) payload bits including HARQ-ACK bits. The first set is always associated with 1 or 2 HARQ-ACK bits and hence, includes only PUCCH format 0 or 1 or both. The range of payload values (minimum and maximum values) for other sets, if configured, is provided by configuration, except for the maximum value for the last set where a default value is used, and the minimum value of the second set being 3. The first set can include a maximum of 32 PUCCH resources of format 0 or 1. Other sets can include a maximum of 8 bits of format 2, 3 or 4.

The wireless device determines a slot for transmission of HARQ-ACK bits in a PUCCH corresponding to physical downlink shared channels (PDSCHs) scheduled or activated by downlink control information (DCI). The activating is via a K1 value provided by configuration or by a field in the corresponding downlink control information (DCI). The wireless device forms a codebook from the HARQ-ACK bits with associated PUCCH in a same slot via corresponding K1 values.

The wireless device determines a PUCCH resource set such that the size of the codebook is within the corresponding range of payload values associated with that set. The wireless device determines a PUCCH resource in that set if the set is configured with a maximum of 8 PUCCH resources by a field in the last DCI associated with the corresponding PDSCHs. If the set is the first set and is configured with more than 8 resources, a PUCCH resource in that set is determined by a field in the last DCI associated with the corresponding PDSCHs according to implicit rules based on the control channel element (CCE).

A physical uplink control channel (PUCCH) resource for HARQ-ACK transmission can overlap in time with other PUCCH resources for channel state information (CSI) and/or scheduling resource (SR) transmissions as well as PUSCH transmissions in a slot. In case of overlapping PUCCH and/or PUSCH resources, the wireless device first resolves any overlapping between PUCCH resources by determining a PUCCH resource carrying the total uplink control information (UCI) (including HARQ-ACK bits) such that the UCI multiplexing timeline requirements are met. There might be partial or complete dropping of CSI bits, if any, to multiplex the UCI in the determined PUCCH resource. Then, the wireless device resolves any overlapping between PUCCH and PUSCH resources by multiplexing the UCI on the PUSCH resource if the timeline requirements for UCI multiplexing is met.

Note that overlap in time can happen since URLLC traffic is usually high priority traffic with a demanding latency constraint. If URLLC traffic arrives at the base station (gNB), it may be necessary to schedule that traffic so that the HARQ feedback is transmitted at the same time that HARQ feedback from an eMBB transmission that was scheduled earlier is transmitted.

A straightforward solution would be to jointly code both eMBB HARQ and URLLC HARQ feedback in this case, but since URLLC traffic generally requires a lower code rate, this would result in using too many radio resources.

Some embodiments include multiplexing first and second HARQ feedback possibly having different priorities. Some embodiments include multiplexing enhanced mobile broadband (eMBB) and ultra reliable low latency communication (URLLC) hybrid automatic repeat request (HARQ) feedback. Some embodiments include a method that includes transmitting a first hybrid automatic repeat request, HARQ, feedback responsive to a first downlink (DL) transmission, the first HARQ feedback transmitted using not more than an indicated number of bits, the first DL transmission having a first priority. The method also includes transmitting a second HARQ feedback responsive to a second DL transmission, the second DL transmission having a second priority higher than the first priority. The method further includes multiplexing the first HARQ feedback and the second HARQ feedback using not more than the indicated number of bits for the first HARQ feedback, to produce a multiplexed HARQ feedback.

Some embodiments include a method at a network node for transmitting to the wireless device an indication of a number of bits to be used to transmit the HARQ feedback for eMBB service to the network node. The method optionally includes receiving multiplexed HARQ feedback for eMBB and ultra reliable low latency communication, URLLC, services from the wireless device using the indicated number of bits. In a wireless device, a method includes receiving an indication of a number of bits to be used to transmit HARQ feedback for eMBB service to the network node. The method in the wireless device further includes multiplexing HARQ feedback for eMBB and ultra reliable low latency communication, URLLC, services, the indicated number of bits being used to represent the HARQ feedback for eMBB.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second wireless device 22b in coverage area 18b is wirelessly connectable to the corresponding network node 16a. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and DL communications. For example, a network node 16 may not or need not be informed about the past routing of an incoming DL communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include a bit unit 32 which is configured to determine whether bits of the received HARQ feedback correspond to the first DL transmission or to the second DL transmission A wireless device 22 is configured to include a multiplexer unit 34 which is configured to multiplex the first HARQ feedback and the second HARQ feedback using not more than the indicated number of bits for the first HARQ feedback, to produce a multiplexed HARQ feedback.

Example implementations, in accordance with an embodiment, of the wireless device 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include bit unit 32 which is configured to determine whether bits of the received HARQ feedback correspond to the first DL transmission or to the second DL transmission.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database, storage array, network storage device, etc.) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include multiplexer unit 34 which is configured to multiplex the first HARQ feedback and the second HARQ feedback using not more than the indicated number of bits for the first HARQ feedback, to produce a multiplexed HARQ feedback.

Figure 2:
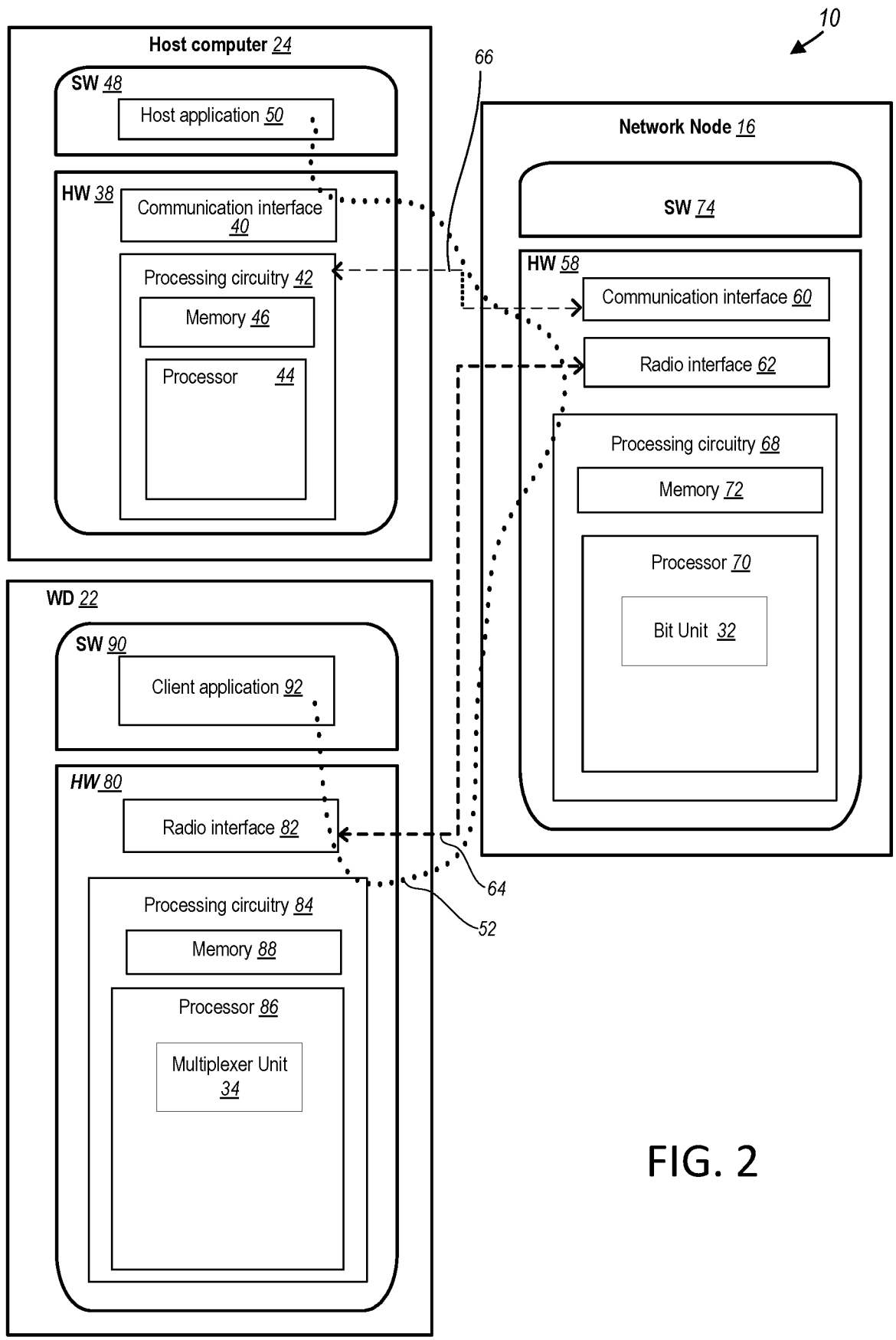
FIG. 2 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the wireless device 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the wireless device 22, and/or preparing/terminating/maintaining/supporting/ending in receipt of a transmission from the wireless device 22.

In some embodiments, the host computer 24 includes processing circuitry 42 and a communication interface 40 that is configured to a communication interface 40 configured to receive user data originating from a transmission from a wireless device 22 to a network node 16. In some embodiments, the wireless device 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as bit unit 32, and multiplexer unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a wireless device 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the wireless device 22 (Block S104). In an optional third step, the network node 16 transmits to the wireless device 22 the user data which was carried in the transmission that the host computer 24 initiated, in accordance with the teachings of the embodiments described throughout this disclosure (Block S106). In an optional fourth step, the wireless device 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the wireless device 22 (Block S112). The transmission may pass via the network node 16, in accordance with the teachings of the embodiments described throughout this disclosure. In an optional third step, the wireless device 22 receives the user data carried in the transmission (Block S114).

Figure 5:
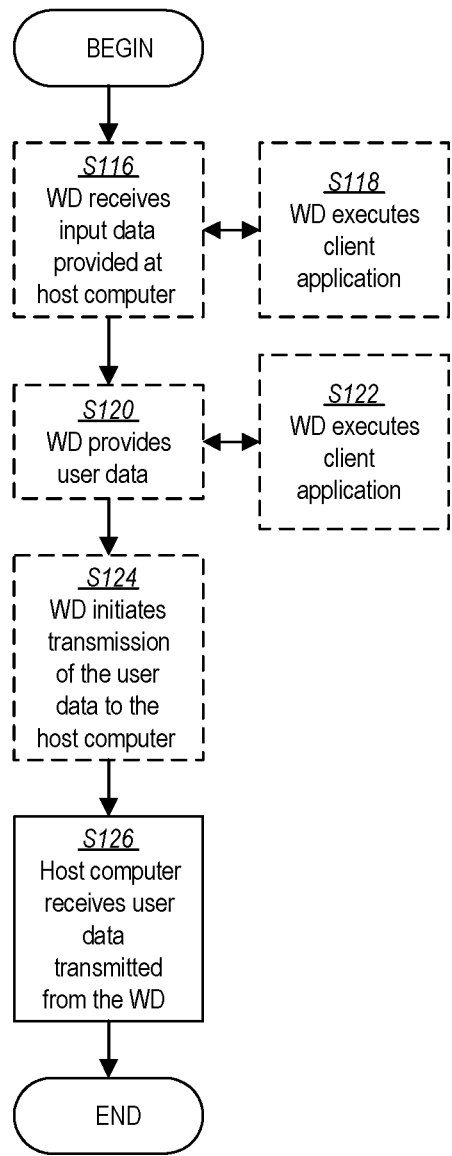
FIG. 5 is a flowchart illustrating exemplary methods implemented in a communication system including a host computer, a network node and a wireless device for receiving user data from the wireless device at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In an optional first step of the method, the wireless device 22 receives input data provided by the host computer 24 (Block S116). In an optional substep of the first step, the wireless device 22 executes the client application 92, which provides the user data in reaction to the received input data provided by the host computer 24 (Block S118). Additionally or alternatively, in an optional second step, the wireless device 22 provides user data (Block S120). In an optional substep of the second step, the wireless device provides the user data by executing a client application, such as, for example, client application 92 (Block S122). In providing the user data, the executed client application 92 may further consider user input received from the user. Regardless of the specific manner in which the user data was provided, the wireless device 22 may initiate, in an optional third substep, transmission of the user data to the host computer 24 (Block S124). In a fourth step of the method, the host computer 24 receives the user data transmitted from the wireless device 22, in accordance with the teachings of the embodiments described throughout this disclosure (Block S126).

Figure 6:
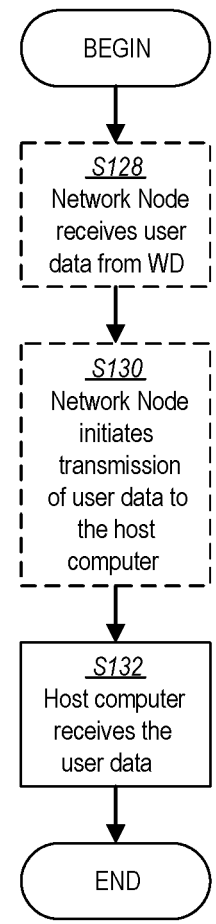
FIG. 6 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In an optional first step of the method, in accordance with the teachings of the embodiments described throughout this disclosure, the network node 16 receives user data from the wireless device 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
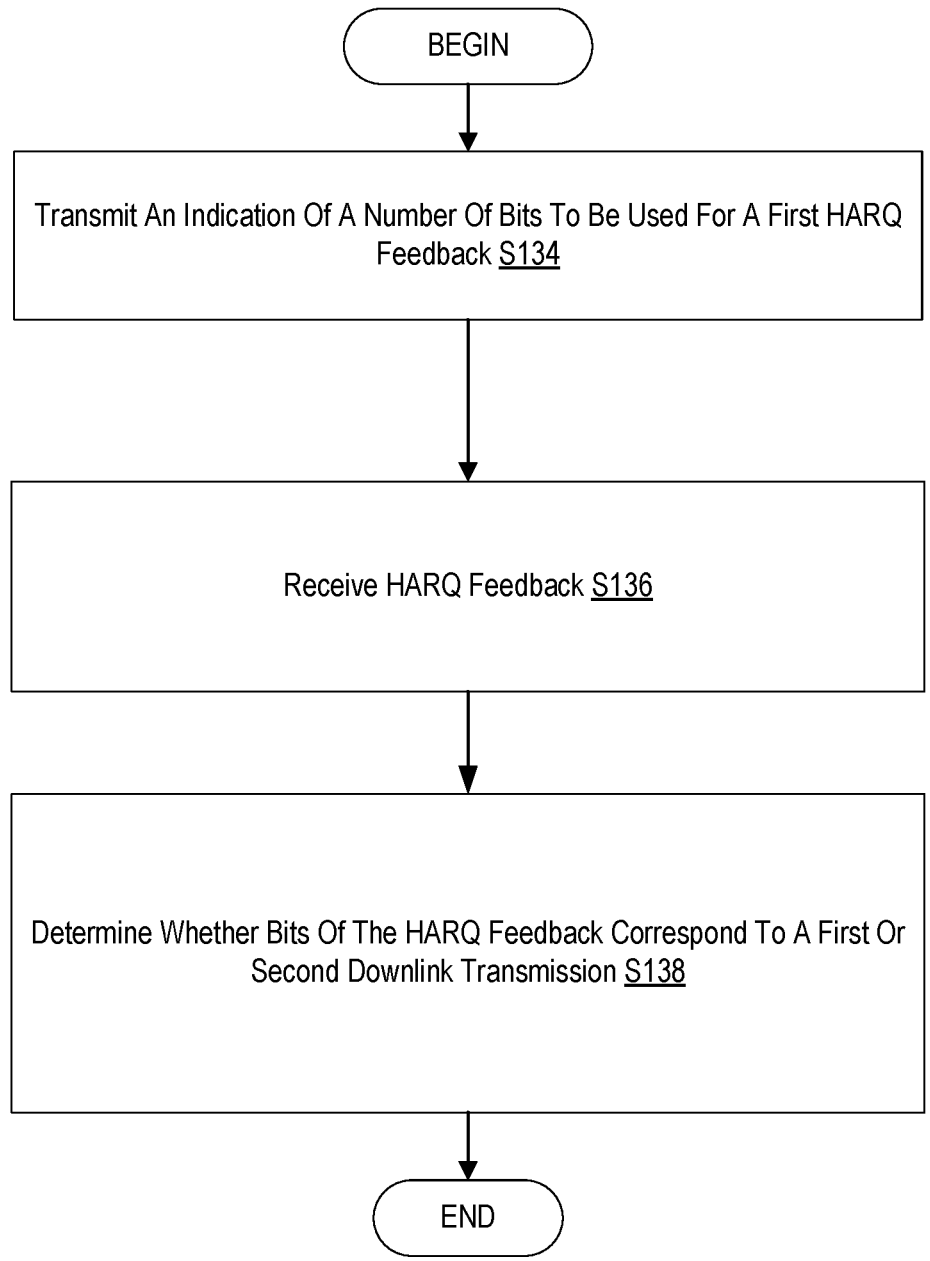
FIG. 7 is a flowchart of an exemplary process in a network node for multiplexing first and second HARQ feedback, the first and second HARQ feedback possibly having different priorities.

FIG. 7 is a flowchart of an exemplary process in a network node 16 for multiplexing enhanced mobile broadband (EMBB) and ultra reliable low latency communication (URLLC) hybrid automatic repeat request (HARM) feedback in accordance with the principles of the present disclosure. One or more blocks described herein may be performed by one or more elements of network node 16 such as by one or more of processing circuitry 68 (including the bit unit 32), processor 70, radio interface 62 and/or communication interface 60. Network node 16 such as via processing circuitry 68 and/or processor 70 and/or radio interface 62 and/or communication interface 60 is configured to transmit an indication of a number of bits to be used by the wireless device to transmit a first hybrid automatic repeat request, HARQ, feedback, the first HARQ feedback being responsive to a first DL transmission, the first DL transmission having a first priority (Block S1340). The process also includes receiving HARQ feedback, the received HARQ feedback including at least one of the first HARQ feedback and second HARQ feedback, the second HARQ feedback being responsive to a second DL transmission, the second DL transmission having a second priority higher than the first priority (Block S136). The process also includes determining whether bits of the received HARQ feedback correspond to the first DL transmission or to the second DL transmission, the received HARQ feedback including the first HARQ feedback multiplexed with the second HARQ feedback, the first HARQ feedback having no more than the indicated number of bits (Block S138).

Figure 8:
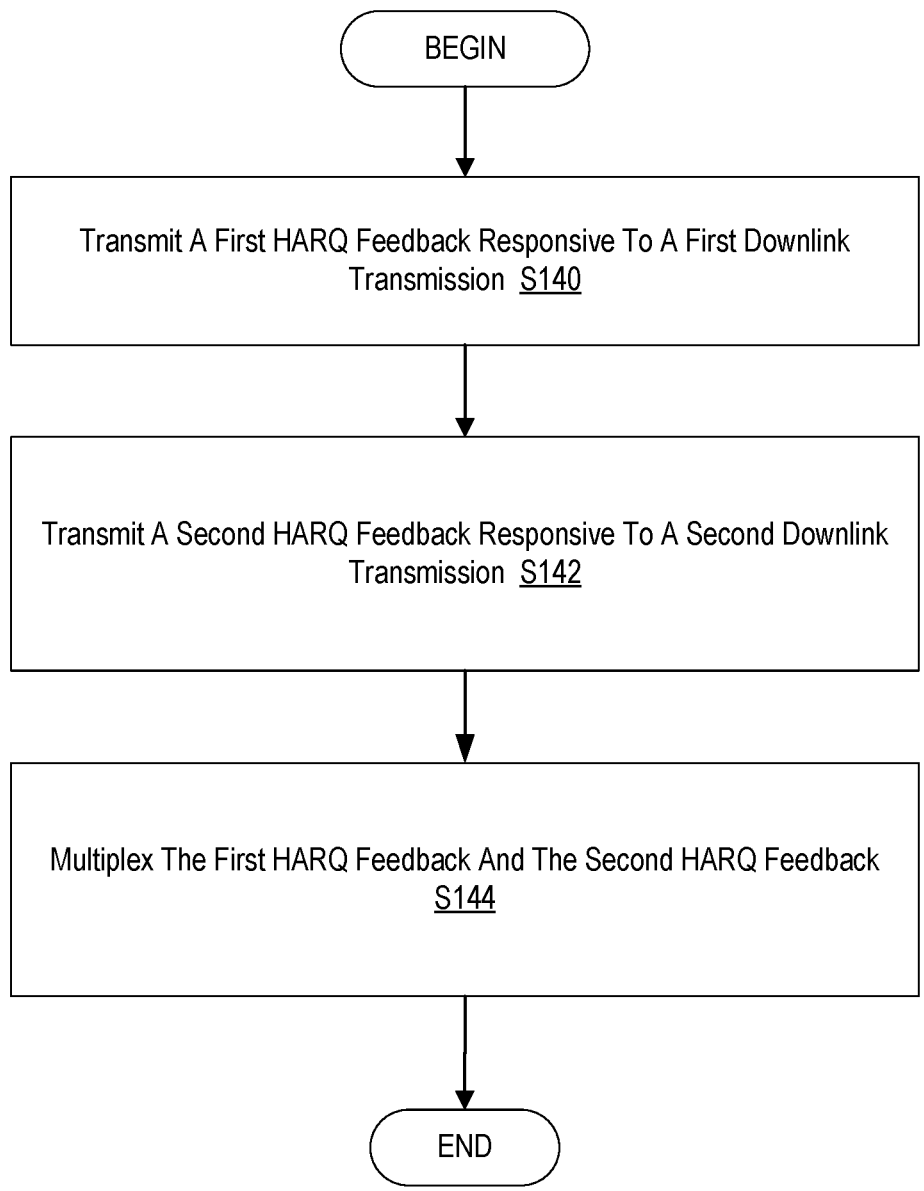
FIG. 8 is a flowchart of an exemplary process in a wireless device according to some embodiments of the present disclosure for multiplexing first and second HARQ feedback, the first and second HARQ feedback possibly having different priorities.

FIG. 8 is a flowchart of an exemplary process in a wireless device 22 according to some embodiments of the present disclosure. One or more blocks described herein may be performed by one or more elements of wireless device 22 such as by one or more of processing circuitry 84 (including the multiplexer unit 34), processor 86, radio interface 82 and/or communication interface 60. Wireless device 22 such as via processing circuitry 84 and/or processor 86 and/or radio interface 82 is configured to transmit a first hybrid automatic repeat request, HARQ, feedback responsive to a first DL transmission, the first HARQ feedback transmitted using not more than an indicated number of bits, the first DL transmission having a first priority (Block S140). The process includes transmitting a second HARQ feedback responsive to a second DL transmission, the second DL transmission having a second priority higher than the first priority (Block S142). The process also includes multiplexing the first HARQ feedback and the second HARQ feedback using not more than the indicated number of bits for the first HARQ feedback, to produce a multiplexed HARQ feedback (Block S144).

Figure 9:
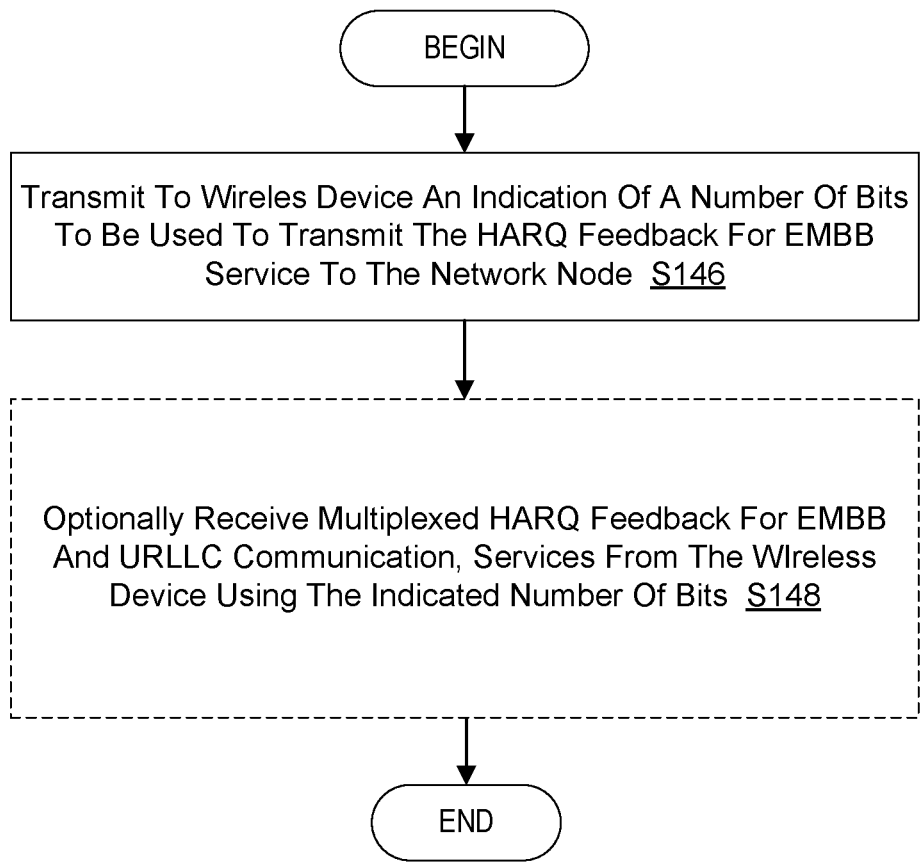
FIG. 9 is a flowchart of an alternative process in a network node for multiplexing first and second HARQ feedback.

FIG. 9 is a flowchart of an exemplary process performed by a network node. One or more blocks described herein may be performed by one or more elements of network node 16 such as by one or more of processing circuitry 68 (including the bit quantity unit 32), processor 70, radio interface 62 and/or communication interface 60. The process includes transmitting, e.g. via the radio interface 62, to the wireless device an indication of a number of bits to be used to transmit the HARQ feedback for eMBB service to the network node (Block S146). The process optionally also includes receiving, e.g. via the radio interface 62, multiplexed HARQ feedback for eMBB and ultra reliable low latency communication, URLLC, services from the wireless device using the indicated number of bits (Block S148).

Figure 10:
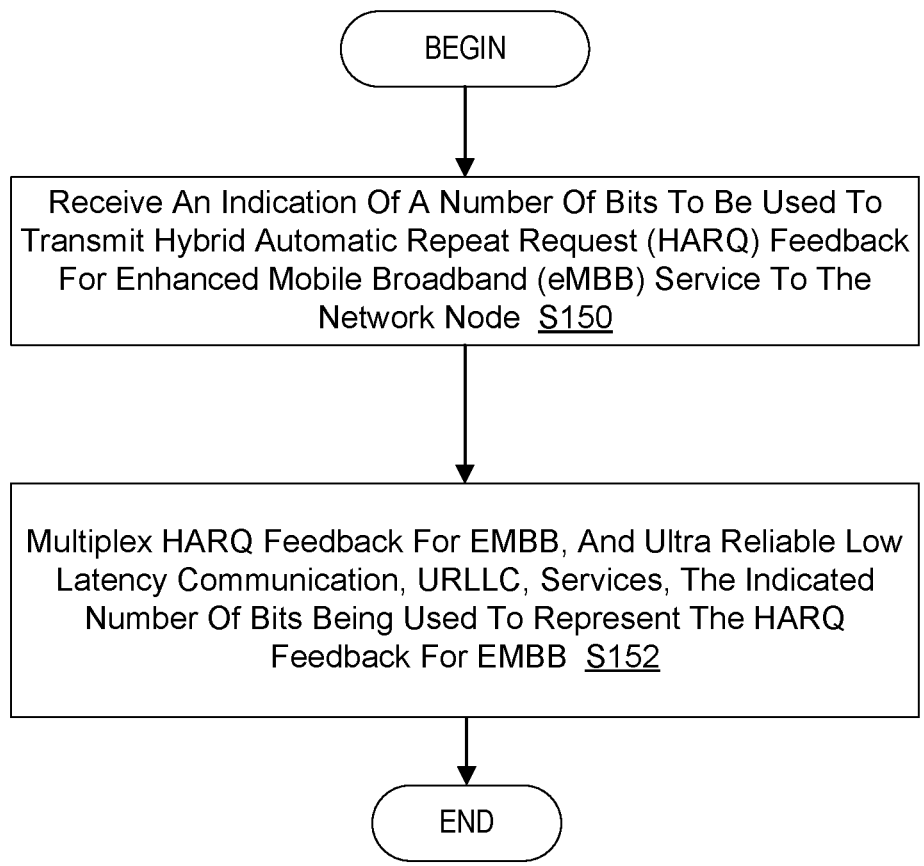
FIG. 10 is a flowchart of an alternative process in a wireless device for multiplexing first and second HARQ feedback.

FIG. 10 is a flowchart of an exemplary process in a wireless device. One or more blocks described herein may be performed by one or more elements of wireless device 22 such as by one or more of processing circuitry 84 (including the multiplexer unit 34), processor 86, radio interface 82 and/or communication interface 60. The process includes receiving, e.g. via the radio interface 82, an indication of a number of bits to be used to transmit hybrid automatic repeat request (HARQ) feedback for enhanced mobile broadband (eMBB) service to the network node (Block S150). The process also includes multiplexing, e.g. via the processing circuitry 84, HARQ feedback, for example, for eMBB and ultra reliable low latency communications, URLLC, services, the indicated number of bits being used to represent the HARQ feedback for eMBB (Block S152).

Having described the general process flow of arrangements of the disclosure and having provided examples of hardware and software arrangements for implementing the processes and functions of the disclosure, the sections below provide details and examples of arrangements for multiplexing enhanced mobile broadband (EMBB) and ultra reliable low latency communication (URLLC) hybrid automatic repeat request (HARQ) feedback.

In some of the following embodiments, some HARQ bits are determined to correspond to eMBB traffic, and some to URLLC traffic. To determine whether a DL transmission is eMBB traffic or URLLC traffic, there are several possibilities.

In some embodiments, HARQ feedback is determined, via the processing circuitry 68, to be URLLC HARQ feedback if the DL transmission is scheduled via the processing circuitry 68, with a specific priority indicator, indicating that the DL transmission is of high priority. In some embodiments, HARQ feedback is determined to be URLLC HARQ feedback if the DL transmission is scheduled with a specific priority indicator, indicating that the DL transmission is of higher priority than a second DL transmission where the specific priority indicator is set to a lower value or is missing. In some embodiments, HARQ feedback is determined to be URLLC HARQ feedback if the DL transmission uses a specific modulation and coding scheme (MCS) table to determine the modulation and coding scheme of the transmission. In some embodiments, HARQ feedback is determined to be URLLC HARQ feedback if the DL transmission utilizes repetition coding (to have reliable transmission) or, at the least, some specific number of repetitions or more. In some embodiments, HARQ feedback is determined to be URLLC HARQ feedback if the DL transmission has a relatively lower latency budget. In some embodiments, HARQ feedback is determined to be URLLC HARQ feedback if the retransmissions are not allowed for a given DL transmission. In some embodiments, HARQ feedback is determined to be URLLC HARQ feedback if the DL transmission occupies fewer than a specific number of orthogonal frequency division multiplexed (OFDM) symbols. In some embodiments, HARQ feedback is determined to be URLLC HARQ feedback if the DL transmission occupies a specific bandwidth part.

In some embodiments, HARQ feedback is determined, via the processing circuitry 68, to be URLLC HARQ feedback if the DL transmission uses semi-persistent scheduling (DL SPS). In some embodiments, HARQ feedback is determined to be URLLC HARQ feedback if the DL transmission is DL SPS and priority is configured semi-persistently (by radio resource control (RRC)). In some embodiments, HARQ feedback is determined to be URLLC HARQ feedback if the DL transmission uses a specific HARQ process. In some embodiments, HARQ feedback is determined to be URLLC HARQ feedback if the DL transmission is scheduled with a specific entry in the transmission data rate adaptation (TDRA) table. In some embodiments, HARQ feedback is determined to be URLLC HARQ feedback if the DL transmission is scheduled by a PDCCH with the DCI scrambled by a certain radio network temporary identifier (RNTI). In some embodiments, HARQ feedback is determined to be URLLC HARQ feedback if the DL transmission is signaled out-of-order. In some HARQ feedback is determined to be URLLC HARQ feedback if related DL transmission pre-empts another transmission dedicated to the same wireless device 22 (intra-wireless device pre-emption).

In some embodiments, a table for mapping of PUCCH resource indication field values to a PUCCH resource in a PUCCH resource set is extended to include HARQ codebook indication indicating a codebook index. The size of PUCCH resource indicator field in the scheduling or activating DCI may or may not be extended.

In some non-limiting versions of the above embodiments, HARQ feedback is determined to be URLLC HARQ feedback if the PUCCH resource indicator indicates an index to a URLLC HARQ codebook. The URLLC HARQ codebook index may be fixed by the specification or configured by RRC. In some embodiments, when there are two HARQ feedback corresponding to two DL transmissions to the same wireless device 22, one is determined to be URLLC HARQ feedback if the scheduling or activation DCI indicates an MCS with spectral efficiency value lower than that of the other DCI. The MCS table used by the two DCI may or may not be the same table.

When the wireless device 22 is to multiplex, such as via the multiplexer unit 34, multiple UCIs of several types for transmission on a same physical channel, the following priority order may be used by the processing circuitry, listed from highest priority to lowest priority:

HARQ-ACK bits for higher-priority PDSCH (e.g., URLLC traffic). This is also called HARQ-ACK-group1 in the following discussion;
HARQ-ACK bits for lower-priority PDSCH (e.g., eMBB traffic). This is also called HARQ-ACK-group2 in the following discussion;
Scheduling request (SR);
CSI with higher priority; and
CSI with lower priority.

The CSI priority ranking may be determined, via the processing circuitry 84, based on several factors, including whether the CSI is periodic, aperiodic, or triggered. When there are insufficient resources to carry all the UCI bits, then the UCI bits may be dropped progressively following priority order, starting with dropping UCI of lowest priority.

In some embodiments, a single HARQ codebook is jointly built, via the wireless device 22, for the eMBB and URLLC HARQ feedback. The single HARQ codebook may then be transmitted either by PUCCH or PUSCH, as in 3GPP Rel-15.

In one non-limiting embodiment, when multiplexing, via the multiplexer unit 34, eMBB and URLLC HARQ feedback, only a single bit is used for the eMBB HARQ feedback. This bit is set to 1 if all of the EMBB HARQ bits that were to be transmitted are equal to 1, otherwise it is set to 0.

In one non-limiting embodiment, when multiplexing eMBB and URLLC HARQ feedback, only a single bit is used for the eMBB HARQ feedback. This bit is set to 1 if all of the detected eMBB DL packets for which HARQ feedback were to be transmitted were correctly decoded, otherwise it is set to 0.

In one non-limiting embodiment, when multiplexing EMBB and URLLC HARQ feedback, the EMBB HARQ bits are divided into groups, where the number of groups is smaller than the number of EMBB HARQ bits. Each group corresponds to one bit that will be used for EMBB HARQ feedback. This bit is set to 1 if all of the HARQ bits in the group that were to be transmitted are equal to 1, otherwise it is set to 0.

In one non-limiting embodiment, when multiplexing EMBB and URLLC HARQ feedback, the EMBB HARQ bits are divided into groups, where the number of groups is smaller than the number of EMBB HARQ bits. Each group corresponds to one bit that will be used for EMBB HARQ feedback. This bit is set to 1 if all of the detected EMBB DL packets for which HARQ feedback were to be transmitted that belong to this group were correctly decoded, otherwise it is set to 0.

In one non-limiting embodiment for semi-static HARQ codebook, one or more bits is reported to indicate a number of non-detected transmissions. In one such embodiment, three bits are reported where a first bit indicates if all detected eMBB transmissions are correctly decoded or not, the second bit indicates that "all HARQ-ACKs correspond to detected transmissions" or "at least one HARQ-ACK corresponds to a non-detected transmission" and where the third bit indicates if URLLC transmission was correctly decoded or not.

In one non-limiting embodiment, when multiplexing EMBB and URLLC HARQ feedback, no bits are used for EMBB HARQ feedback, i.e., EMBB HARQ feedback is dropped.

In some non-limiting versions of the above embodiments, multiplexing of two or more HARQ feedbacks follows embodiments described above, where the bundle size of HARQ feedback is set according to HARQ feedback priorities. For example, if two HARQ feedbacks are of different priorities, HARQ feedback with less priority may be bundled in the same way as for EMBB HARQ feedback in the above embodiments, where the bundle size is fixed by specification or can be configured in RRC. If two HARQ feedbacks have the same priority, both HARQ feedbacks may be multiplexed without bundling.

In some non-limiting versions of the above embodiments, URLLC and EMBB HARQ feedback is only multiplexed when the feedback is transmitted on PUCCH. If the feedback is transmitted on PUSCH, they are separately encoded. In some non-limiting versions of the above embodiments, URLLC and EMBB HARQ feedback are multiplexed when the feedback is transmitted on PUSCH using the beta-offset corresponding to that of URLLC. In some non-limiting versions of the above embodiments, URLLC and EMBB HARQ feedback is only multiplexed when both of them are transmitted on PUCCH. In some non-limiting embodiments, the PUCCH resource set to use for a transmission is determined, via the processing circuitry 84, by both the payload and the priority of the transmission. One set of PUCCH resources is used if at least one of the transmissions have high priority, otherwise another PUCCH resource set is used.

In some embodiments, the wireless device 22 may consider the following rules for decoding feedback.

| Bit/DTX | Feedback decoding rule |
| --- | --- |
| 1 | URLLC ACK eMBB ACK |
| 0 | URLLC ACK eMBB NACK |
| DTX (Discontinuous Transmission) | URLLC NACK eMBB ACK |

The network node 16 can change the mapping, e.g., 0 can be mapped to URLLC ACK, or eMBB ACK. Other options can be changed. For URLLC non-acknowledgment (NACK) and eMBB NACK, the probability is very low, so that option may be ruled out. However, in cases where the wireless device 22 confronts that situation, the wireless device 22 may consider feedback options which correspond to URLLC NACK and eMBB ACK.

In some non-limiting embodiments, the HARQ codebook for eMBB is constructed, via the processing circuitry 84, with separate HARQ bits for different code block groups, carriers, and/or time intervals (e.g., a slot or mini-slot). When reducing the number of HARQ bits for eMBB through bundling, all code blocks may be bundled together to form a single feedback bits per transport block.

In some non-limiting embodiments, the HARQ codebook for eMBB is constructed with separate HARQ bits for different code block groups, carriers, and/or time intervals (e.g., a slot or mini-slot). In some embodiments, when reducing the number of HARQ bits for eMBB through bundling, first all code blocks are bundled together to form a single feedback bits per transport block, then all carriers are bundled together to form a single feedback bit per time interval.

In some non-limiting embodiments, the HARQ codebook for eMBB is constructed with separate HARQ bits for different code block groups, carriers, and/or time intervals (e.g., a slot or mini-slot). In some embodiments, when reducing the number of HARQ bits for eMBB through bundling, first all code blocks are bundled together to form single feedback bits per transport block, then all time intervals to be reported are bundled together to form a single feedback bit per carrier.

In some embodiments, a HARQ codebook is separately built for the eMBB and URLLC HARQ feedback, with one HARQ codebook (HARQ-ACK-part1) built for URLLC HARQ feedback, and another HARQ codebook (HARQ-ACK-part2) built for eMBB HARQ feedback.

If a wireless device 22 is configured with a secondary cell group (SCG), the wireless device 22 may apply the procedures described in this disclosure for both master cell group (MCG) and secondary cell group (SCG). If the wireless device 22 is configured with a PUCCH-SCell, the wireless device 22 may apply the procedures described in this disclosure for both primary PUCCH group and secondary PUCCH group In one embodiment, if a wireless device 22 transmits HARQ-ACK-group1 and HARQ-ACK-group 2 on overlapping physical channels, the wireless device 22 prioritizes the physical channel for HARQ-ACK-group1, and drops the physical channel for HARQ-ACK-group2. This may be performed only after lower priority UCI (e.g., CSI UCI), if present, are already dropped.

In one embodiment, if a wireless device 22 would transmit HARQ-ACK-group1 and HARQ-ACK-group2 on overlapping physical channels, the wireless device 22 may concatenate HARQ-ACK-group1 and HARQ-ACK-group2 bits in transmission. The transmission can be via PUCCH or PUSCH.

For PUCCH formats 1, 3, or 4, a wireless device 22 can be configured a number of slots, N_PUCCH^repeat, for repetitions of a PUCCH transmission by respective nrofSlots. HARQ-ACK-group1 bits are prioritized to be carried by PUCCH with repetition.

According to one aspect, a method implemented in a network node 16 is provided. The method includes transmitting to the wireless device 22 an indication of a number of bits to be used to transmit hybrid automatic repeat request, HARQ, feedback for enhanced Mobile Broadband, eMBB, service to the network node 16. The method further optionally includes receiving multiplexed HARQ feedback for eMBB and ultra reliable low latency communication, URLLC, services from the wireless device 22 using the indicated number of bits.

According to this aspect, in some embodiments, the number of bits used to represent the HARQ feedback for eMBB service is based at least in part on a priority indicator transmitted by the network node 16. In some embodiments, the number of bits used to represent the HARQ feedback for eMBB service is based at least in part on a HARQ codebook selected by the network node 16.

According to another aspect, a method implemented in a wireless device 22, is provided. The method includes receiving an indication of a number of bits to be used to transmit hybrid automatic repeat request, HARQ, feedback for enhanced mobile broadband, eMBB, service to a network node 16. The method further includes multiplexing HARQ feedback for eMBB and ultra reliable low latency communications, URLLC, services, the indicated number of bits being used to represent the HARQ feedback for eMBB.

According to this aspect, in some embodiments, the number of bits used to represent the HARQ feedback for eMBB service is based at least in part on a priority indicator transmitted by the network node 16. In some embodiments, the number of bits used to represent the HARQ feedback for eMBB service is based at least in part on a HARQ codebook selected by the network node 16.

According to one aspect, a wireless device, configured to communicate with a network node, the wireless device comprising a radio interface and processing circuitry in communication with the radio interface. The radio interface is configured to transmit a first hybrid automatic repeat request, HARQ, feedback responsive to a first DL transmission, the first HARQ feedback transmitted using not more than an indicated number of bits, the first DL transmission having a first priority. The radio interface is further configured to transmit a second HARQ feedback responsive to a second DL transmission, the second DL transmission having a second priority higher than the first priority. The processing circuitry is configured to multiplex the first HARQ feedback and the second HARQ feedback using not more than the indicated number of bits for the first HARQ feedback, to produce a multiplexed HARQ feedback.

According to this aspect, in some embodiments, the first DL transmission corresponds to an evolved mobile broadband, eMBB, transmission process and the second DL transmission corresponds to an ultra-reliable low latency communication, URLLC. In some embodiments, a certain number of bits of the first HARQ feedback are dropped in order to use the indicated number of bits. In some embodiments, a number of bits of the first HARQ feedback that are multiplexed is less than the indicated number of bits when there is overlap of resources for transmitting the first HARQ feedback and the second HARQ feedback. In some embodiments, there are no bits of the first HARQ feedback multiplexed with the second HARQ feedback when there is the overlap. In some embodiments, the indicated number of bits is indicated by the network node in DL control information, DCI. In some embodiments, bits are dropped from uplink control information (UCI) having the multiplexed HARQ feedback when there is overlap of resources for transmitting the multiplexed HARQ feedback, the bits being dropped according to the following priority: bits of channel state information, CSI, with low priority are dropped before bits of CSI with high priority are dropped; bits of CSI with high priority are dropped before bits of a scheduling resource, SR, are dropped; and bits of the SR are dropped before bits of the second HARQ feedback are dropped. In some embodiments, the second HARQ feedback is determined to be ultrareliable low latency communication, URLLC, feedback when the second DL transmission is scheduled with a priority indicator indicating that the second priority is higher than the first priority. In some embodiments, the multiplexed HARQ feedback includes a bit for the first HARQ feedback, the bit being set to one state when all bits of the first HARQ feedback are equal to one, and set to an opposite state, otherwise. In some embodiments, the multiplexed HARQ feedback includes a bit for the first HARQ feedback, the bit being set to one state when a plurality of detected DL packets for which the first HARQ feedback is responsive are correctly decoded, and being set to an opposite state, otherwise.

According to another aspect, a method in a wireless device configured to communicate with a network node, includes transmitting a first hybrid automatic repeat request, HARQ, feedback responsive to a first DL transmission, the first HARQ feedback transmitted using not more than an indicated number of bits, the first DL transmission having a first priority. The method also includes transmitting a second HARQ feedback responsive to a second DL transmission, the second DL transmission having a second priority higher than the first priority. The method further includes multiplexing the first HARQ feedback and the second HARQ feedback using not more than the indicated number of bits for the first HARQ feedback, to produce a multiplexed HARQ feedback.

According to this aspect, in some embodiments, the first DL signal corresponds to an evolved mobile broadband, eMBB, transmission process and the second DL transmission corresponds to an ultra-reliable low latency communication, URLLC. In some embodiments, a certain number of bits of the first HARQ feedback are dropped in order to use the indicated number of bits. In some embodiments, a number of bits of the first HARQ feedback that are multiplexed is less than the indicated number of bits when there is overlap of resources for transmitting the first HARQ feedback and the second HARQ feedback. In some embodiments, there are no bits of the first HARQ feedback multiplexed with the second HARQ feedback when there is the overlap. In some embodiments, the indicated number of bits is indicated by the network node in DL control information, DCI. In some embodiments, bits are dropped from uplink control information (UCI) having the multiplexed HARQ feedback when there is overlap of resources for transmitting the multiplexed HARQ feedback, the bits being dropped according to the following priority: bits of channel state information, CSI, with low priority are dropped before bits of CSI with high priority are dropped; bits of CSI with high priority are dropped before bits of a scheduling resource, SR, are dropped; and bits of the SR are dropped before bits of the second HARQ feedback are dropped. In some embodiments, the second HARQ feedback is determined to be ultrareliable low latency communication, URLLC, feedback when the second DL transmission is scheduled with a priority indicator indicating that the second priority is higher than the first priority. In some embodiments, the multiplexed HARQ feedback includes a bit for the first HARQ feedback, the bit being set to one state when all bits of the first HARQ feedback are equal to one, and set to an opposite state, otherwise. In some embodiments, the multiplexed HARQ feedback includes a bit for the first HARQ feedback, the bit being set to one state when a plurality of detected DL packets for which the first HARQ feedback is responsive are correctly decoded, and being set to an opposite state, otherwise.

In some embodiments, the first HARQ feedback bits are divided into a number of groups, the number of groups being smaller than a total number of the first HARQ feedback bits, each group corresponding to a bit to be used for the first HARQ feedback, the bit being set to one state when all of the first HARQ feedback bits in the group are equal to one, and being set to an opposite state, otherwise. In some embodiments, the first HARQ feedback bits are divided into a number of groups, the number of groups being smaller than a total number of the first HARQ feedback bits, each group corresponding to a bit to be used for the first HARQ feedback, the bit being set to one state when a plurality of detected DL packets for which the first HARQ feedback is responsive are correctly decoded, and being set to an opposite state, otherwise. In some embodiments, a first bit of the first HARQ feedback bits indicates whether detected first DL transmissions are correctly decoded; a second bit of the first HARQ feedback bits indicates whether all HARQ acknowledgements, HARQ-ACK, correspond to detected transmissions or whether at least one HARQ-ACK corresponds to a non-detected transmission; and a third bit of the first HARQ feedback bits indicates whether a low latency transmission was correctly decoded. In some embodiments, the first HARQ feedback is bundled, a bundle size being fixed or configured by radio resource control signaling. In some embodiments, when the first HARQ feedback and the second HARQ feedback have a same priority, the first HARQ feedback and the second HARQ feedback being multiplexed without bundling. In some embodiments, the first HARQ feedback and the second HARQ feedback are multiplexed only if the first HARQ feedback and the second HARQ feedback are to be transmitted on a physical uplink control channel, PUCCH. In some embodiments, a physical uplink control channel, PUCCH, resource set to be used for transmission of the multiplexed HARQ feedback is determined based at least in part on a priority of the transmission. In some embodiments, one PUCCH resource set is used if the priority of the transmission is determined to be high and another PUCHH resource set is used if the priority of the transmission is determined to be low. In some embodiments, when the multiplexed HARQ feedback is transmitted on a physical uplink shared channel, PUSCH, the first HARQ feedback and the second HARQ feedback are separately encoded. In some embodiments, separate HARQ bits are used for different code block groups, carriers and/or time intervals.

According to another aspect, a network node is configured to communicate with a wireless device according to a broad band process and to communicate with the wireless device according to a low latency process. The network node includes a radio interface configured to: transmit an indication of a number of bits to be used by the wireless device to transmit a first hybrid automatic repeat request, HARQ, feedback, the first HARQ feedback being responsive to a first DL transmission, the first DL transmission having a first priority; and receive HARQ feedback, the received HARQ feedback including at least one of the first HARQ feedback and second HARQ feedback, the second HARQ feedback being responsive to a second DL transmission, the second DL transmission having a second priority higher than the first priority. The network node also includes processing circuitry in communication with the radio interface, the processing circuitry configured to determine whether bits of the received HARQ feedback correspond to the first DL transmission or to the second DL transmission, the received HARQ feedback including the first HARQ feedback multiplexed with the second HARQ feedback, the first HARQ feedback having no more than the indicated number of bits.

According to this aspect, in some embodiments, the first DL transmission corresponds to an evolved mobile broadband, eMBB, transmission process and the second DL transmission corresponds to an ultra-reliable low latency communication, URLLC. In some embodiments, bits of the received HARQ feedback are determined to correspond to second HARQ feedback when a corresponding DL transmission is scheduled with a priority indicator configured to indicate the second priority. In some embodiments, bits of the received HARQ feedback are determined to correspond to second HARQ feedback when a corresponding DL transmission uses a modulation and coding scheme, MCS, table to determine an MCS of the corresponding DL transmission. In some embodiments, bits of the received HARQ feedback are determined to correspond to second HARQ feedback when a corresponding DL transmission uses repetition coding. In some embodiments, bits of the received HARQ feedback are determined to correspond to second HARQ feedback when corresponding retransmissions of a corresponding DL transmission are not allowed. In some embodiments, bits of the received HARQ feedback are determined to correspond to second HARQ feedback when a corresponding DL transmission occupies fewer than a predetermined number of orthogonal frequency division multiplexed (OFDM) symbols. In some embodiments, bits of the received HARQ feedback are determined to correspond to second HARQ feedback when a corresponding DL transmission occupies a predetermined bandwidth part. In some embodiments, bits of the received HARQ feedback are determined to correspond to second HARQ feedback when a corresponding DL transmission uses semi-persistent scheduling, SPS. In some embodiments, bits of the received HARQ feedback are determined to correspond to second HARQ feedback when a corresponding DL transmission uses semi-persistent scheduling, SPS, and priority is configured semi-persistently.

According to yet another aspect, a method in a network node configured to communicate with a wireless device according to a broad band process and to communicate with the wireless device according to a low latency process is provided. The method includes transmitting an indication of a number of bits to be used by the wireless device to transmit a first hybrid automatic repeat request, HARQ, feedback, the first HARQ feedback being responsive to a first DL transmission, the first DL transmission having a first priority. The method also includes receiving HARQ feedback, the received HARQ feedback including at least one of the first HARQ feedback and second HARQ feedback, the second HARQ feedback being responsive to a second DL transmission, the second DL transmission having a second priority higher than the first priority. The method also includes determining whether bits of the received HARQ feedback correspond to the first DL transmission or to the second DL transmission, the received HARQ feedback including the first HARQ feedback multiplexed with the second HARQ feedback, the first HARQ feedback having no more than the indicated number of bits.

According to this aspect, in some embodiments, the first DL transmission corresponds to an evolved mobile broadband, eMBB, transmission process and the second DL transmission corresponds to an ultra-reliable low latency communication, URLLC. In some embodiments, bits of the received HARQ feedback are determined to correspond to second HARQ feedback when a corresponding DL transmission is scheduled with a priority indicator configured to indicate the second priority. In some embodiments, bits of the received HARQ feedback are determined to correspond to second HARQ feedback when a corresponding DL transmission uses a modulation and coding scheme, MCS, table to determine an MCS of the corresponding DL transmission. In some embodiments, bits of the received HARQ feedback are determined to correspond to second HARQ feedback when a corresponding DL transmission uses repetition coding. In some embodiments, bits of the received HARQ feedback are determined to correspond to second HARQ feedback when corresponding retransmissions of a corresponding DL transmission are not allowed. In some embodiments, bits of the received HARQ feedback are determined to correspond to second HARQ feedback when a corresponding DL transmission occupies fewer than a predetermined number of orthogonal frequency division multiplexed (OFDM) symbols. In some embodiments, bits of the received HARQ feedback are determined to correspond to second HARQ feedback when a corresponding DL transmission occupies a predetermined bandwidth part. In some embodiments, bits of the received HARQ feedback are determined to correspond to second HARQ feedback when a corresponding DL transmission uses semi-persistent scheduling, SPS.

In some embodiments, bits of the received HARQ feedback are determined to correspond to second HARQ feedback when a corresponding DL transmission is at least one of: scheduled with a preselected entry in a transmission data rate adaptation, TDRA, table scheduled by a physical downlink control channel, PDCCH, with a downlink control information, DCI, scrambled by a preselected radio network temporary identifier, RNTI; signaled out of order; and/or preemptive of another DL transmission to the wireless device. In some embodiments, bits of the received HARQ feedback are determined to correspond to second HARQ feedback when a physical uplink control channel, PUCCH, resource indicator indicates an index to a second HARQ codebook. In some embodiments, a table for mapping physical uplink control channel, PUCCH, resource indicator field values to a PUCCH resource in a PUCCH resource set is extended to include a HARQ codebook indication indicating a codebook index. In some embodiments, a size of the PUCCH resource indicator field is extendible.

Some further examples include:

Example A1. A network node configured to communicate with a wireless device (WD), the network node configured to, and/or comprising a radio interface and/or comprising processing circuitry configured to:
transmit to the WD an indication of a number of bits to be used to transmit hybrid automatic repeat request, HARQ, feedback for enhanced Mobile Broadband, eMBB, service to the network node; and
optionally receive multiplexed HARQ feedback for eMBB and ultra reliable low latency communication, URLLC, services from the WD using the indicated number of bits.

Example A2. The network node of Example A1, wherein the number of bits used to represent the HARQ feedback for eMBB service is based at least in part on a priority indicator transmitted by the network node.

Example A3. The network node of Example A1, wherein the number of bits used to represent the HARQ feedback for eMBB service is based at least in part on a HARQ codebook selected by the network node.

Example B1. A method implemented in a network node, the method comprising:
transmitting to the WD an indication of a number of bits to be used to transmit hybrid automatic repeat request, HARQ, feedback for enhanced Mobile Broadband, eMBB, service to the network node; and
optionally receiving multiplexed HARQ feedback for eMBB and ultra reliable low latency communication, URLLC, services from the WD using the indicated number of bits.

Example B2. The method of Example B1, wherein the number of bits used to represent the HARQ feedback for eMBB service is based at least in part on a priority indicator transmitted by the network node.

Example B3. The method of Example B1, wherein the number of bits used to represent the HARQ feedback for eMBB service is based at least in part on a HARQ codebook selected by the network node.

Example C1. A wireless device (WD) configured to communicate with a network node, the WD configured to, and/or comprising a radio interface and/or processing circuitry configured to:
receive an indication of a number of bits to be used to transmit hybrid automatic repeat request, HARQ, feedback for enhanced mobile broadband, eMBB, service to the network node; and
multiplex HARQ feedback for eMBB and ultra reliable low latency communication, URLLC, services, the indicated number of bits being used to represent the HARQ feedback for eMBB.

Example C2. The wireless device of Example C1, wherein the number of bits used to represent the HARQ feedback for eMBB service is based at least in part on a priority indicator transmitted by the network node.

Example C3. The wireless device of Example C1, wherein the number of bits used to represent the HARQ feedback for eMBB service is based at least in part on a HARQ codebook selected by the network node.

Example D1. A method implemented in a wireless device (WD), the method comprising:
receiving an indication of a number of bits to be used to transmit hybrid automatic repeat request, HARQ, feedback for enhanced mobile broadband, eMBB, service to a network node; and
multiplexing HARQ feedback for eMBB and ultra reliable low latency communications, URLLC, services, the indicated number of bits being used to represent the HARQ feedback for eMBB.

Example D2. The method of Example D1, wherein the number of bits used to represent the HARQ feedback for eMBB service is based at least in part on a priority indicator transmitted by the network node.

Example D3. The method of Example D1, wherein the number of bits used to represent the HARQ feedback for eMBB service is based at least in part on a HARQ codebook selected by the network node.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A wireless device configured to communicate with a network node, the wireless device comprising a radio interface and processing circuitry in communication with the radio interface,
the radio interface configured to:
transmit a first hybrid automatic repeat request, HARQ, feedback responsive to a first downlink, DL, transmission, the first HARQ feedback transmitted using not more than a number of bits indicated for the first HARQ feedback, the first DL transmission having a first priority; and
transmit a second HARQ feedback responsive to a second DL transmission, the second DL transmission having a second priority higher than the first priority; and
the processing circuitry configured to:
multiplex the first HARQ feedback and the second HARQ feedback using not more than the indicated number of bits for the first HARQ feedback, to produce a multiplexed HARQ feedback, a certain number of bits of the first HARQ feedback being dropped in order to use the indicated number of bits.

2. The wireless device of claim 1, wherein a number of bits of the first HARQ feedback that are multiplexed is less than the indicated number of bits when there is overlap of resources for transmitting the first HARQ feedback and the second HARQ feedback.

3. The wireless device of claim 2, wherein there are no bits of the first HARQ feedback multiplexed with the second HARQ feedback when there is the overlap.

4. The wireless device of claim 1, wherein the indicated number of bits is indicated by the network node in DL control information, DCI.

5. The wireless device of claim 1, wherein bits are dropped from uplink control information (UCI) having the multiplexed HARQ feedback when there is overlap of resources for transmitting the multiplexed HARQ feedback, the bits being dropped according to the following priority:
bits of channel state information, CSI, with low priority are dropped before bits of CSI with high priority are dropped;
bits of CSI with high priority are dropped before bits of a scheduling resource, SR, are dropped; and
bits of the SR are dropped before bits of the second HARQ feedback are dropped.

6. The wireless device of claim 1, wherein the multiplexed HARQ feedback includes a bit for the first HARQ feedback, the bit being set to one state when all bits of the first HARQ feedback are equal to one, and set to an opposite state, otherwise.

7. The wireless device of claim 1, wherein the multiplexed HARQ feedback includes a bit for the first HARQ feedback, the bit being set to one state when a plurality of detected DL packets for which the first HARQ feedback is responsive are correctly decoded, and being set to an opposite state, otherwise.

8. A method performed by a wireless device configured to communicate with a network node, the method comprising:
   transmitting a first hybrid automatic repeat request, HARQ, feedback responsive to a first downlink, DL, transmission, the first HARQ feedback transmitted using not more than a number of bits indicated for the first HARQ feedback, the first DL transmission having a first priority;
   transmitting a second HARQ feedback responsive to a second DL transmission, the second DL transmission having a second priority higher than the first priority; and
   multiplexing the first HARQ feedback and the second HARQ feedback using not more than the indicated number of bits for the first HARQ feedback, to produce a multiplexed HARQ feedback, a certain number of bits of the first HARQ feedback being dropped in order to use the indicated number of bits.

9. The method of claim 8, wherein the first DL transmission corresponds to an evolved mobile broadband, eMBB, transmission process and the second DL transmission corresponds to an ultra-reliable low latency communication, URLLC.

10. The method of claim 8, wherein a number of bits of the first HARQ feedback that are multiplexed is less than the indicated number of bits when there is overlap of resources for transmitting the first HARQ feedback and the second HARQ feedback.

11. The method of claim 10, wherein there are no bits of the first HARQ feedback multiplexed with the second HARQ feedback when there is the overlap.

12. The method of claim 8, wherein the indicated number of bits is indicated by the network node in DL control information, DCI.

13. The method of claim 8, wherein bits are dropped from uplink control information (UCI) having the multiplexed HARQ feedback when there is overlap of resources for transmitting the multiplexed HARQ feedback, the bits being dropped according to the following priority:
   bits of channel state information, CSI, with low priority are dropped before bits of CSI with high priority are dropped;
   bits of CSI with high priority are dropped before bits of a scheduling resource, SR, are dropped; and
   bits of the SR are dropped before bits of the second HARQ feedback are dropped.

14. The method of claim 13, wherein the second HARQ feedback is determined to be ultrareliable low latency communication, URLLC, feedback when the second DL transmission is scheduled with a priority indicator indicating that the second priority is higher than the first priority.

15. The method of claim 8, wherein the multiplexed HARQ feedback includes a bit for the first HARQ feedback, the bit being set to one state when all bits of the first HARQ feedback are equal to one, and set to an opposite state, otherwise.

16. The method claim 8, wherein the multiplexed HARQ feedback includes a bit for the first HARQ feedback, the bit being set to one state when a plurality of detected DL packets for which the first HARQ feedback is responsive are correctly decoded, and being set to an opposite state, otherwise.

17. A network node configured to communicate with a wireless device according to a broad band process and to communicate with the wireless device according to a low latency process, the network node comprising:
   a radio interface configured to:
      transmit an indication of a number of bits to be used by the wireless device to transmit a first hybrid automatic repeat request, HARQ, feedback, the first HARQ feedback being responsive to a first downlink, DL, transmission, the first DL transmission having a first priority; and
      receive HARQ feedback, the received HARQ feedback including at least one of the first HARQ feedback and second HARQ feedback, the second HARQ feedback being responsive to a second DL transmission, the second DL transmission having a second priority higher than the first priority; and
   processing circuitry in communication with the radio interface, the processing circuitry configured to determine whether bits of the received HARQ feedback correspond to the first DL transmission or to the second DL transmission, the received HARQ feedback including the first HARQ feedback multiplexed with the second HARQ feedback, the received HARQ feedback having no more bits than the indicated number of bits for the first HARQ feedback, a certain number of bits of the first HARQ feedback having been dropped in order to use the indicated number of bits.

18. The network node of claim 17, wherein bits of the received HARQ feedback are determined to correspond to second HARQ feedback when at least one of:
   a corresponding DL transmission uses a modulation and coding scheme, MCS, table to determine an MCS of the corresponding DL transmission;
   corresponding DL transmission uses repetition coding;
   corresponding retransmissions of a corresponding DL transmission are not allowed;
   a corresponding DL transmission occupies fewer than a predetermined number of orthogonal frequency division multiplexed (OFDM) symbols;
   corresponding DL transmission occupies a predetermined bandwidth part;
   corresponding DL transmission uses semi-persistent scheduling, SPS; and
   a corresponding DL transmission uses semi-persistent scheduling, SPS, and priority is configured semi-persistently.

19. A method performed by a network node configured to communicate with a wireless device, wireless device, according to a broad band process and to communicate with the wireless device according to a low latency process, the method comprising:
   transmitting an indication of a number of bits to be used by the wireless device to transmit a first hybrid automatic repeat request, HARQ, feedback, the first HARQ feedback being responsive to a first downlink, DL, transmission, the first DL transmission having a first priority; and
   receiving HARQ feedback, the received HARQ feedback including at least one of the first HARQ feedback and second HARQ feedback, the second HARQ feedback being responsive to a second DL transmission, the second DL transmission having a second priority higher than the first priority; and determining whether bits of the received HARQ feedback correspond to the first DL transmission or to the second DL transmission, the received HARQ feedback including the first HARQ feedback multiplexed with the second HARQ feedback, the HARQ feedback having no more bits than the indicated number of bits for the first HARQ feedback, a certain number of bits of the first HARQ feedback having been dropped in order to use the indicated number of bits.

20. The method of claim 19, wherein bits of the received HARQ feedback are determined to correspond to second HARQ feedback based on at least one of the following:

a corresponding DL transmission uses a modulation and coding scheme, MCS, table to determine an MCS of the corresponding DL transmission;

a corresponding DL transmission uses repetition coding;

corresponding retransmissions of a corresponding DL transmission are not allowed;

a corresponding DL transmission occupies fewer than a predetermined number of orthogonal frequency division multiplexed (OFDM) symbols;

a corresponding DL transmission occupies a predetermined bandwidth part;

a corresponding DL transmission uses semi-persistent scheduling, SPS; and a corresponding DL transmission uses semi-persistent scheduling, SPS, and priority is configured semi-persistently.

* * * * *